Patented Oct. 23, 1928. 1,688,756

UNITED STATES PATENT OFFICE.

by employing anisidyl and other alkoxy substituted mustard oils in place of phenetidyl mustard oil used in the example.

The unsymmetrical di-substituted-guanidine produced as described has been used as a vulcanization accelerator in a so-called cushion stock compound comprising 100 parts pale crepe rubber,
15 parts zinc oxide,
3.25 parts sulphur,
0.5 part p-di-methyl-amino-phenyl-p-phenetidyl-guanidine.

The resulting compound so obtained was then vulcanized by heating portions of the compound for different periods of time in a press maintained at the temperature (287° F.) given by a steam pressure of forty pounds per square inch. The portions so heated were then tested and the following results were obtained:

| Time of cure | Modulus of elasticity at elongation of— | | | Tensile strength at break in lbs./in.² | Ultimate elongation |
|---|---|---|---|---|---|
| | 300% | 500% | 700% | | |
| 30 min. at 287° F | 168 | 378 | 1,423 | 3,170 | 870% |
| 60 min. at 287° F | 262 | 654 | 2,760 | 4,300 | 790% |

A vulcanized rubber product possessing a high tensile strength is seen from the above results to be obtained after heating for approximately one hour under the conditions set forth.

The accelerator hereinbefore described has also been employed in a tread stock composition. Such a stock comprised:

36.5 parts smoked sheet rubber,
20 parts #2 amber crepe rubber,
25 parts carbon black,
2 parts sulphur,
1 part of a blended mineral and vegetable oil,
1 part stearic acid,
3.5 parts mineral rubber,
11 parts zinc oxide,
0.5 part p-di-methyl-amino-phenyl-p-phenetidyl-guanidine.

The above composition was compounded in the usual manner and vulcanized by heating under the conditions hereinbefore set forth. Portions of the stock, heated as described for different periods of time, were tested and the following results were obtained:

| Time of cure | Modulus of elasticity at elongation of— | | Tensile strength at break in lbs./in.² | Ultimate elongation |
|---|---|---|---|---|
| | 300% | 500% | | |
| 1 hr. 15 min. at 287° F | 1,085 | 2,820 | 3,965 | 655% |
| 1 hr. 45 min. at 287° F | 1,220 | 2,875 | 3,940 | 555% |

The particular stock employing the preferred accelerator as set forth yields a vulcanized product possessing a high tensile strength and other desired properties after vulcanizing for approximately one hour and fifteen minutes.

A further example of a different type of rubber product produced by the use of the preferred accelerator is in the manufacture of a hard rubber. A rubber stock comprising the following ingredients was compounded in the usual manner 20 parts #2 amber crepe rubber,
20 parts smoked sheet rubber,
5 parts lime,
17.5 parts zinc oxide,
27.5 parts sulphur,
10 parts mineral rubber,
0.5 part p-di-methyl-amino-phenyl-p-phenetidyl-guanidine.

The above stock was found to yield a good hard rubber after heating in a press at 287° F. for approximately two hours and forty-five minutes.

A so-called pure gum stock comprising 100 parts pale crepe rubber,
5 parts zinc oxide,
3.5 parts sulphur,
0.5 part of the accelerator employed in the previous examples was compounded and the stock vulcanized as before.

A cured product was obtained after heating for from thirty to forty-five minutes in a press maintained under a temperature of approximately 287° F.

The examples hereinbefore given are understood to be illustrative only and not at all limitative of the scope of my invention. Other examples illustrating the use of the accelerator set forth in various types of rubber products are apparent to those skilled in the art of rubber compounding. The invention is not limited to the use of an accelerator manufactured by the particular process as described, since the accelerator may be formed by properly employing other methods practiced for the formation of the guanidine derivative desired. The invention is to be considered as limited only by the following claims appended hereto and forming a part of this specification wherein I intend to claim all novelty inherent in my invention as broadly as is permissible in view of the prior art.

It is apparent from the foregoing description that the compounds designated as dissimilar-aryl di-substituted guanidines hereinbefore set forth as rubber vulcanization accelerators, preferably comprise guanidine derivatives wherein different aryl groups or substituted aryl groups are substituted in place of two hydrogen atoms linked to two different nitrogen atoms. Such guanidines are of an entirely different type from those obtained by replacing two hydrogen atoms attached to the same nitrogen atom by two dissimilar groups.

What I claim is:

1. The process of manufacturing vulcanized rubber which comprises heating a mixture of rubber and sulphur in the presence of p-di-methyl-amino-phenyl-p-phenetidyl guanidine.

2. A vulcanized rubber product obtained by heating a mixture of rubber and sulphur in the presence of p-di-methyl-amino-phenyl-p-phenetidyl-guanidine.

In testimony whereof I affix my signature.

WINFIELD SCOTT.